April 3, 1962 R. T. SHEEN 3,028,225
CHEMICAL ANALYZER
Filed Sept. 15, 1959 6 Sheets-Sheet 1

INVENTOR:
ROBERT T. SHEEN
BY Howson & Howson
ATTYS.

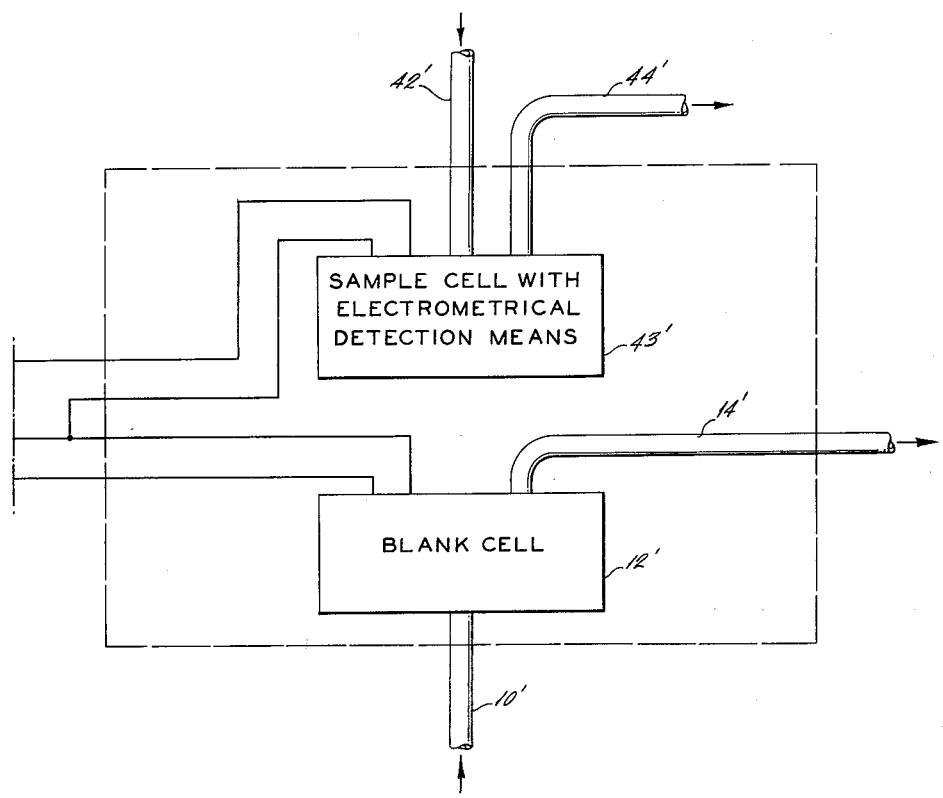
FIG. 1ᵃ.

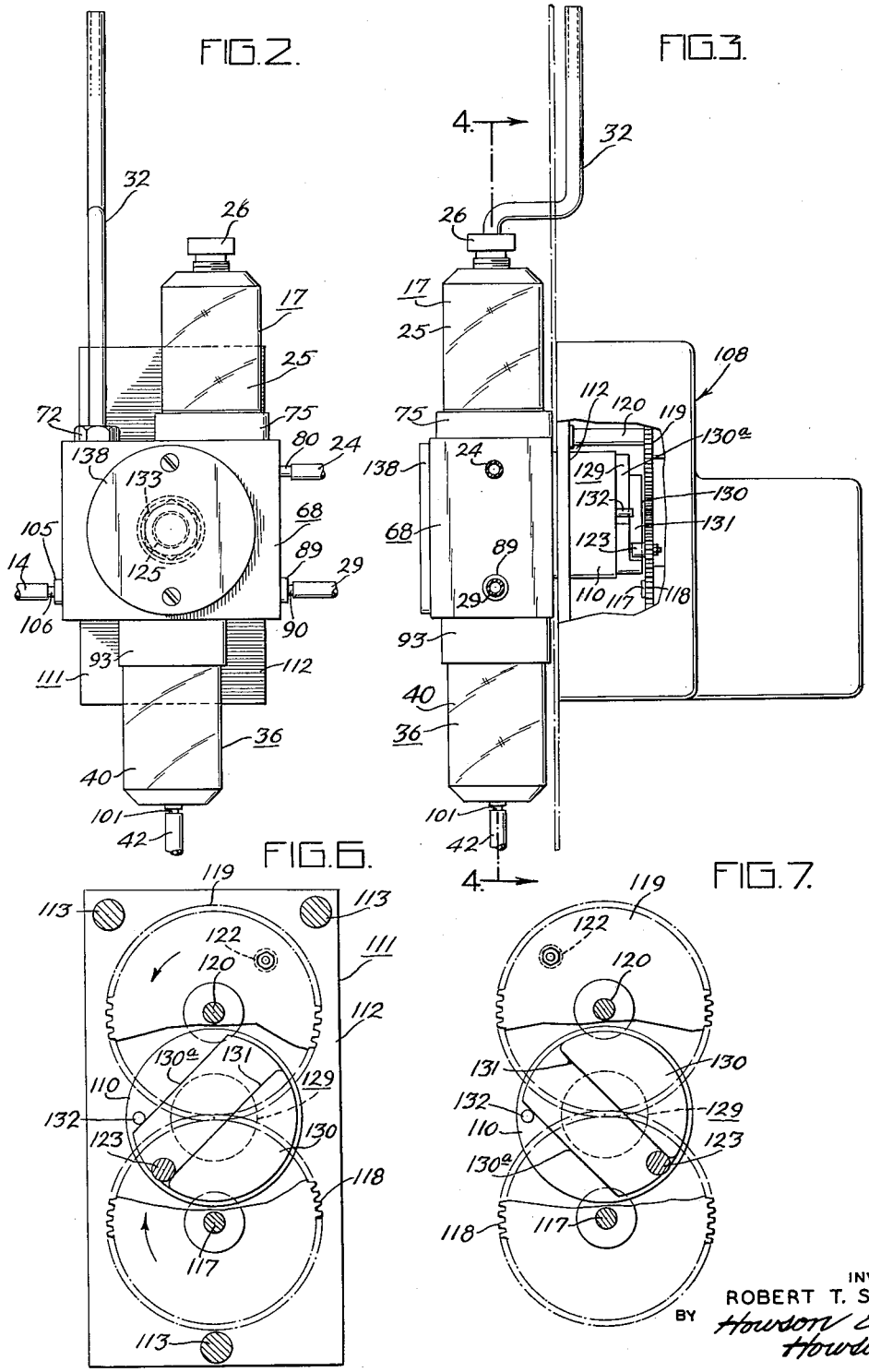

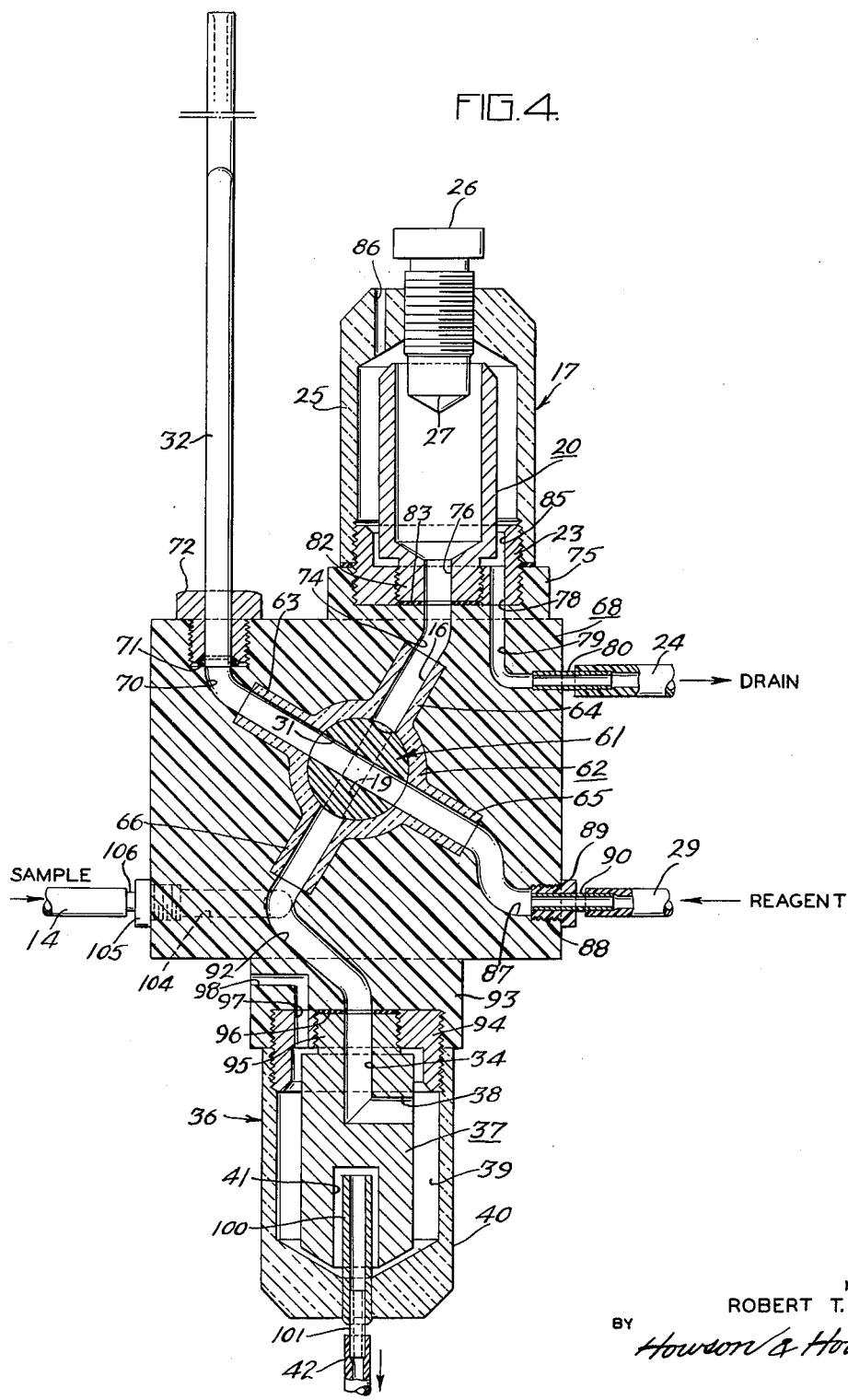

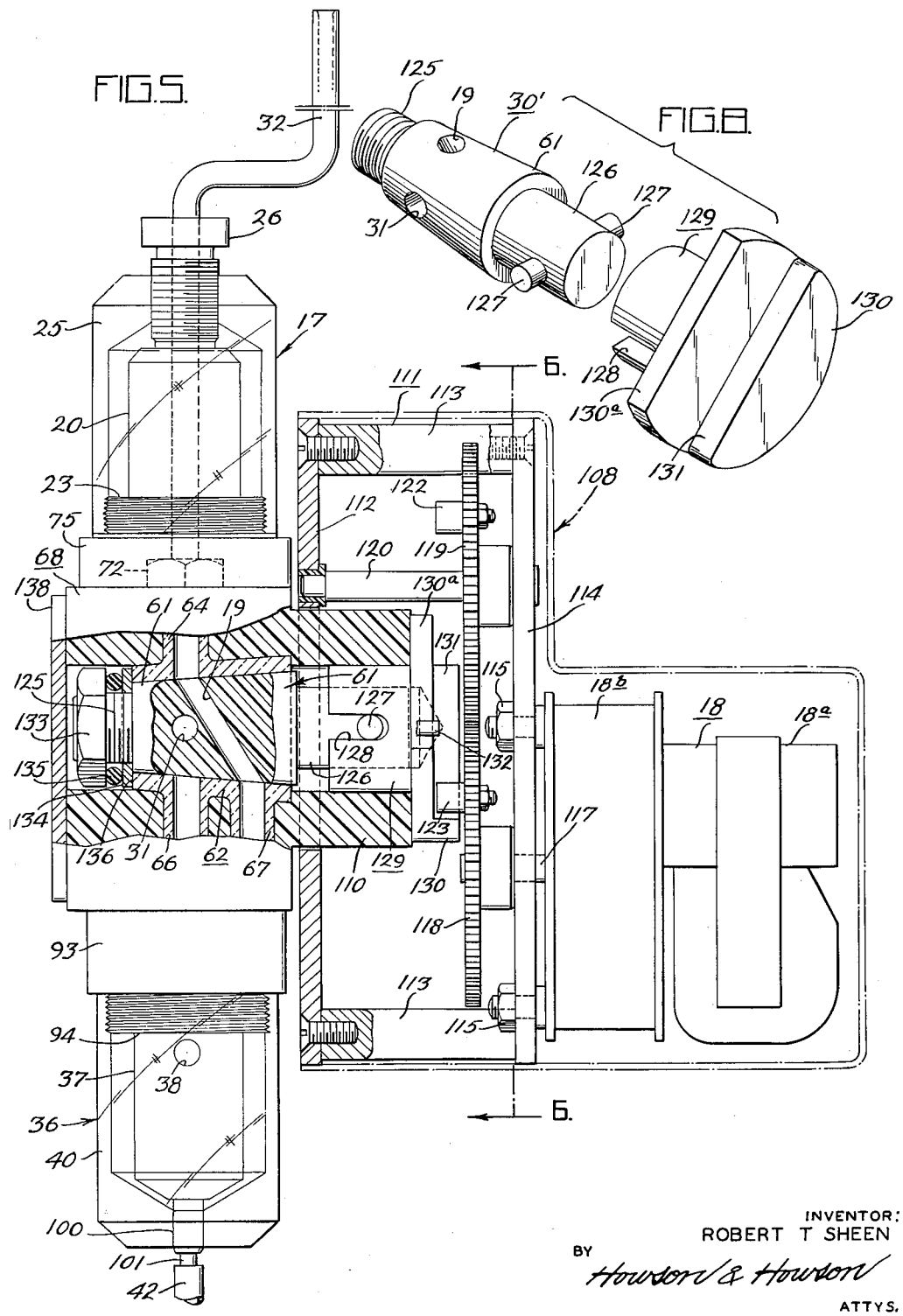

April 3, 1962 R. T. SHEEN 3,028,225
CHEMICAL ANALYZER
Filed Sept. 15, 1959 6 Sheets-Sheet 6

INVENTOR;
ROBERT T. SHEEN
BY
Howson & Howson
ATTYS.

United States Patent Office 3,028,225
Patented Apr. 3, 1962

3,028,225
CHEMICAL ANALYZER
Robert T. Sheen, Fort Washington, Pa., assignor to Milton Roy Company, Philadelphia, Pa., a corporation of Pennsylvania
Filed Sept. 15, 1959, Ser. No. 840,075
22 Claims. (Cl. 23—253)

This invention relates to an analyzer for detecting the presence of chemical constituents by automatic means. The analyzer employs a unique measurement system whereby the movement of a fixed volume device, such as a precision bore in the plug of a stopcock, both measures and programs the addition of a selected volume of chemical reagent to a previously measured volume of sample in controlled ratio to give rise to a measurable variable as a means of chemical analysis.

In the prior art, automatic chemical analyzers have employed various means of adding reagent to a solution to be analyzed. In many systems the reagent is added by burette manipulation or by some equivalent means. The accuracy of such devices has often presented something of a problem and, in order to achieve satisfactory accuracy, a relatively complex control system is frequently required.

The control system contemplated by the present invention is an extremely simple one which permits the highly precise addition of reagent to a carefully measured amount of test solution. The precision measurement of reagent is achieved by use of a precision bore through the plug of a stopcock, or through a precision bore or its equivalent in some other structure having relatively movable parts, i.e., through a rotatable disc or a slide. The term "bore" is used herein as a broad generic term to define a cavity no matter how formed in which a precise fixed volume is measured. The "fixed volume" is fixed only for a particular measurement and embodiments in which bore or cavity size might be changed are not intended to be excluded. The bore is used as a measuring means usually for reagent. Larger volume measure, such as the fluid sample, is accomplished preferably by means of a simple fixed volume overflow type of sample measurement and storage means. Although this volume is susceptible of adjustment it will be understood that it is "fixed" in a sense that it remains constant for a given experiment. The fluid measured in this larger volume measure is sometimes referred to herein as the "second fluid." In preferred embodiments, following the measurement step, the reagent is washed out of the bore by the flow of test solution through the bore. The mixture of reagent and second fluid then passes to a device in which mixing is encouraged and in which the reaction may be completed.

The system may be made fully automatic by providing automatic gravity feed of the second fluid as well as reagent, the two fluids flowing simultaneously to a fixed volume overflow device and a sight glass level indicator, respectively. This flow may be through separate bores in the same stopcock, disc, slide, or the like, or through bores in individual stopcocks controlled by the same mechanism. After the filling or measuring process, the measuring bore, filled with reagent, is preferably repositioned in the flow path of the second fluid flowing from the fixed volume system and aligned with the mixing chamber inlet. At the same time the sample supply is closed off by mere movement of the precision bore. All that is required to complete and repeat the cycle is suitable drive means, which may be adapted from conventional systems.

For a better understanding of the present invention, reference is made to the following drawings in which:

FIG. 1a is a highly schematic showing representing an alternative analysis system for the system of FIG. 1 in which electrometrical means is employed.

FIG. 2 is a front elevational view of a preferred embodiment of the analyzer of the present invention.

FIG. 3 is a side elevational view of the analyzer of the present invention.

FIG. 4 is a sectional view taken along line 4—4 of FIG. 3.

FIG. 5 is an enlarged view similar to FIG. 3 partially in section and showing the plug stopcock arrangement.

FIG. 6 is a sectional view taken along line 6—6 of FIG. 5 showing the drive mechanism with the stopcock in one extreme position.

FIG. 7 is a view of the drive mechanism with the stopcock in the other extreme position.

FIG. 8 is a perspective view of the plug portion of the stopcock and its drive attachment.

Figure 1:
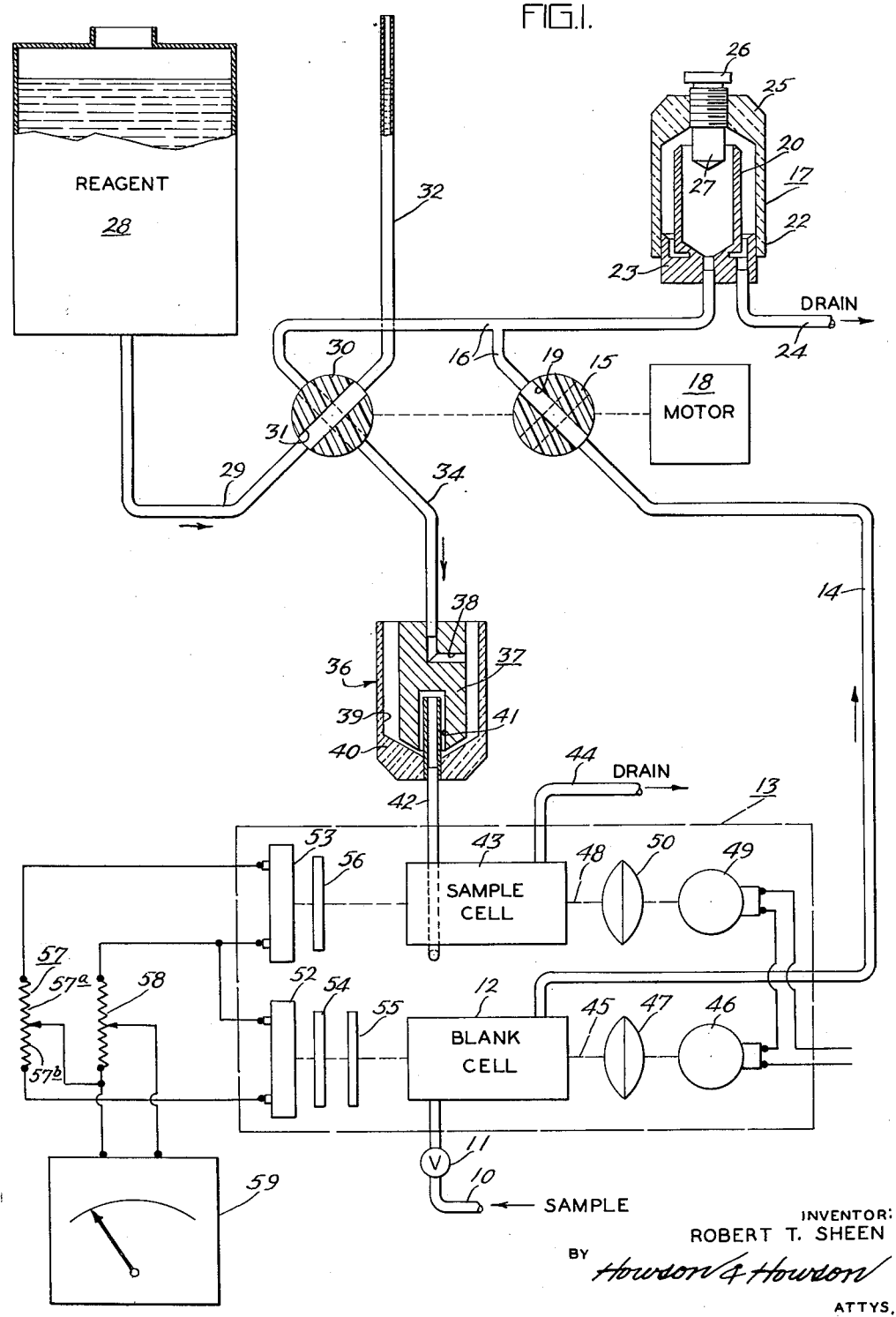
FIG. 1 is a schematic view of the hydraulic system of the present invention with conventional electrical and optical systems for colorimetric analysis.

Referring first to FIG. 1, a schematic diagram of the hydraulic and electrical portions of the system is illustrated. Since the second fluid is commonly test or sample fluid the specific description hereafter will assume that it is sample fluid, for purposes of illustration. As seen in FIG. 1, sample fluid to be tested is fed to a supply line 10 through a regulating needle valve 11, which regulates sample flow rate, into a hollow, transparent cell 12 in an optical color comparison system 13. Cell 12 is termed a blank cell since the color change effected by the reagent has not yet been produced. From cell 12 the sample flow is fed through supply line 14 to a stopcock 15 having a bore 19, and thence into a system of tubing designated 16 and an overflow chamber generally designated 17. The system of tubing 16 and overflow chamber 17 constitute a fixed volume measuring or storage system for the test sample.

The stopcock 15 is driven by a motor 18. When its bore 19 is in the position shown, the fluid sample under pump or preferably under gravity pressure will flow into the fixed volume system 16 and 17. When the motor drives the stopcock plug 15 away from the position in which flow proceeds as described all flow terminates.

Within the overflow chamber 17 is a cup-like vessel 20 into which fluid flows from the bottom and over the top edge of which excess fluid will flow. Excess fluid flowing over the top edge is confined between the outer wall of vessel 20 and outer casing 22. Bottom wall 23 serves to block all flow except through tubing 24 which passes to a drain. Through the closed end 25 of casing 22 is threaded a plug member 26 the end of which 27 projects into the open mouth of cup 20 to reduce the total volume of fluid which can be contained by cup 20 before overflow. The further portion 27 projects into the overflow container 20, the smaller the volume of fluid which can be contained by the system, and the member 26 may be accordingly calibrated in terms of the fixed volume of test fluid which the fixed volume system can supply.

The solution to be analyzed, or the sample, is subjected to a reagent in order to detect the presence of certain chemicals by a change in color. In accordance with the present invention, a supply of reagent is provided in reservoir 28 which feeds through supply line 29 to a plug stopcock 30 having a precision bore 31 of predetermined volume. In preferred versions of the present invention, only one stopcock or other movable system is employed in which event stopcock 30 may simply be taken to indicate the portion of stopcock 15 containing a second bore 31. Beyond this plug in line with precision bore 31, when it is in line with supply line 29, is another line constituting a portion of sight glass 32 which extends generally vertically to above the topmost possible fluid level of reservoir. Thus it will be seen that this system is open to the atmosphere at each end. As a consequence, when bore 31 aligns their conduits, the air contained in the bore will rise and be discharged. In the system shown, this will take place through the sight glass, the liquid in sight glass 32 assuming the level of fluid in reservoir 28. The diameter of the bore in the sight glass, the bore and all associated conduits must be of sufficient diameter so that surface tension effects will not prevent the rise of entrapped air.

Bore 31 is arranged to be realigned with a portion of the fluid conduit system 16 at one end and with effluent line at the other end. Plug stopcock 30 is preferably driven by motor 18 in synchronism with plug stopcock 15 such that, when bore 19 is positioned to fill the overflow system 16, 17, the sample bore 31 is positioned to be filled with reagent, and only after bore 19 is turned out of alignment with the supply line 14 is bore 31 aligned with overflow system 16 and effluent line 34. Having previously been filled with a precise volume of reagent, depending upon the volume of bore 31, when the plug cock 30 is realigned with the overflow system 16, 17, the fixed volume of sample collected in the overflow system will flow through the bore 31 washing out the reagent and emptying by gravity into the mixing chamber 36 so that no fluid remains in bore 31. Effluent line 34 terminates in the mixing chamber within a central block 37 having a plurality of radial supply lines 38 to a relatively large volume mixing chamber 39 between the central block 37 and the inner sidwalls of an outer cup member 40. The block 37 is spaced from the bottom of cup 40 and has a reentrant center bore 41 into which the reagent and sample mixture rise as the mixing chamber fills. When the chamber fills to such a level that the liquid overflows the top of an extension of mixture supply line 42, syphon action occurs and continues until the contents of the mixing chamber have been emptied. The design of the mixing chamber is preferably such that overflow and syphon action will not begin until the full liquid contents of the fixed volume system have been almost completely discharged, and it will not complete until all fluid has been emptied into the mixing chamber. The spacing between the reentrant bore 41 side walls and line 42 is such as to assure the timing and also to promote complete emptying of the mixing chamber. The design of the system is also such that the mixture will remain in the mixing chamber a sufficient time for mixing and reaction to occur. Thus when the mixture reaches the sample cell 43 through supply line 42, the reagent and sample are thoroughly mixed and any color change has taken place. Color cell 43 is preferably of smaller volume than the capacity of mixing cell so that flow from the mixing cell will tend to cause the previous sample to flow through waste line 44 to drain and flush out the cell.

The so-called blank cell 12 is placed in the light beam 45 from light source 46 which is focused by lens means 47 through the cell. Similarly, light beam 48 from light source 49 is focused by means of lens 50 through sample cell 43. The lamps employed as light sources 46 and 49 are preferably series connected so that voltage fluctuations will have the same effect on both and so that any circuit failure or open circuit will affect both lamps the same. Alternatively, a single light source may be employed in place of the two light source system illustrated. In either event suitable photo electric detection means 52 and 53 may be preceded by filters 54, 55 and 56 to achieve any special compensating or color filtering effects.

Photoelectric cells 52 and 53 are in a bridge circuit with the resistors 57 and 58. Resistor 57 is subdivided by a center tap into resistor sections 57a and 57b opposite cells 53 and 52, respectively, in the bridge circuit. The center tap of resistor 57 is used to connect resistance 58 across the bridge between the two photoelectric cells 52 and 53. A meter 59 is connected between the center tap of resistor 57 and a center tap to resistor 58. Balance of the bridge depends upon the effects of light beams 45 and 48 upon the output of photocells 52 and 53. Exact balance of light intensity under zero conditions, for example, might be achieved partially optically by the filters 54, 55 and 56. Fine balancing and error correction may be achieved electrically by adjustment of the center taps on resistors 57 and 58. If the analyzer is to be used to indicate when tolerances are exceeded, when the bridge becomes out of balance more than a predetermined amount the tolerance level of the particular constitutent by calibration of the meter 59 will be known to have been exceeded. The meter may also be calibrated in terms of percentage or absolute amounts of the particular constituent being tested.

A practical and preferred embodiment of the present invention, as opposed to the schematic showing of FIG. 1, is illustrated in FIGS. 2 to 8. As can be seen best in FIGS. 4 and 5, the heart of the structure is the unitary plug stopcock 61 which is preferably composed of Teflon to afford both the lubricating and sealing advantages of that material. As seen in FIGS. 5 and 8, the structure consists of a body 61 of slightly tapered, hence frusto-conical, form. Through this single body 61 are provided both bores 19 and 31. Bore 31 is made to extend diametrically through the plug at right angles to the major axis thereof. Bore 19, by contrast, is placed at a diagonal to the axis and, preferably, lies in a plane through the axis perpendicular to a plane through the axis in which bore 31 lies. Other angular relationships are, of course, possible, particularly where a system is provided for more than one reagent. In such a structure a plurality of bores may be required in different planes through the axis.

The plug 61 is received within a generally tubular socket 62 preferably composed of glass and to the inner surface of which the plug 61 snugly conforms. Integrally cast with the socket 62 are tubular arms 63, 64, 65, 66 and 67, the bores of which are able to be aligned with bores 19 and 31 through the plug 61. The glass casting 62 is, in turn, cast within a resinous block 68 which may be composed of a suitable prepared and potted epoxy resin. Tubular arm 63 terminates within the block in a tunnel or channel 70 which is an extension of sight glass 32. Sight glass 32 is either cast into the block or provided with sealing means 71 holding it in tight engagement with tunnel 70 by means of plug 72 which makes threaded engagement with block 68.

Tubular arm 64 is aligned with tunnel 74 which terminates axially within a dished boss 75 cast integrally with block 68 the inner sidewalls of which are threaded to receive threads on member 17 whereby when in position the inflow duct 76 will be aligned with channel 74. The structure of overflow device 17 is somewhat modified from the schematic arrangement shown in FIG. 1 by making the members 20 and 23, shown as an integral structure of FIG. 1, as separate pieces. Flange 23 at the base of cup 20 is actually a ring with both its outer and inner edges threaded. Ring 23 must be so positioned that duct 78 lines up with tunnel 79 in block 68 and terminates in nipple 80 to which a drain hose 24 may be connected. The base 82 of cup 20, in addition to providing the axial bore 76 aligned with tunnel 74, provided threads on its outer surface and enables the placing of a sealing gasket 83 between the member 82 and the bottom of the dished boss 75 to prevent leakage of flow, the flow passing through channel 74 into duct 76. An annular sump channel 85 of generally L-shaped cross-section permits overflow to be collected before being drained off through duct 78. There is also a venting orifice 86 which permits the escape of any air trapped in the outer housing 25.

Tubular arm 65 is extended by tunnel 87 terminated in a threaded portion 88 which receives hollow plug 89 which supports an integral nipple 90 to which a hose connection providing the reagent line 29 may be affixed.

Tubular arm 66 is extended by tunnel 92 through block 68 terminating axially within dished boss 93. Dished boss 93 corresponds to dished boss 75. Its inner sidewalls are threaded to receive mixing device 36 rather than overflow device 17, however. It will be observed that many of the parts of mixing device 36 are similar to parts of overflow device 17 so that the basic castings used for one component can also be used for the other. Tunnel 92 constitutes part of the duct 34 which extends axially into the block 37 of the mixing device and then passes radially outwardly in one or more ducts 38. Again, the structure is held in place by a ring member 94 threaded on its outside to engage the threaded inner side wall of boss 93, and threaded on the inside to engage threaded shank 95 of the block 37. The end of shank 95 also serves to compress a sealing gasket 96. Ring 94 is subject to some problems of positioning since it provides a duct 97 which must be mated with tunnel 98 through boss 93 in order to provide a venting duct to the mixing chamber structure. As previously described, flow proceeds out the duct, or ducts, 38 into the mixing chamber and specifically into the annular space 39 between block 37 and the sidewalls of the cup 40. As the mixture rises in this region, it must also rise in reentrant portion 41 of block 37. Eventually its level within the reentrant portion will permit overflow into the end of the stem member 100 thereby initiating syphon action, as previously described. The stem member 100 which passes through the bottom of cup member 40, terminates in a nipple 101 to which tubing serving as mixture supply line 42 is connected to supply the color comparison cell as previously described.

Tubular arm 67, which is more clearly seen in FIG. 5, is extended by tunnel 104 (FIG. 4) in block 68 which terminates in a threaded portion engaging plug 105. Plug 105 is preferably provided with a sealing gasket similar to 71 and provides a nipple 106 to which tubing providing sample supply line 14 may be affixed.

It is contemplated that the reagent storage reservoir shown in FIG. 1 would be combined with the package unit shown in FIGS. 4 and 5, but it may be kept separate as implied by these figures.

As can be seen in FIG. 3, the drive structure is advantageously contained within a housing 108 located immediately behind the plug stopcock structure shown in FIG. 4. Referring to FIG. 5, a preferred arrangement of the drive structure is illustrated. As can be seen from FIG. 5, the block 68 is extended rearwardly in a tubular projection 110. The frame generally designated 111 is preferably made up of a plate 112 having a neck-engaging opening which surrounds tubular projection 110 and is supported thereon. Lateral support rods 113 are connected to a backplate 114 which through bolts 115 supports the motor structure 18. The motor structure 18 includes the actual motor 18a and a suitable gear reducer 18b through which motor 18a is connected to shaft 117. Shaft 117 supports a large gear member 118 and gear 118, in turn, meshes with and drives a similar gear 119 on a shaft 120 extending between front and back plates 111 and 114. It will be apparent that the gears revolve in opposite directions as indicated in the elevational view shown in FIG. 6. FIGS. 6 and 7 show pins 122 and 123 on gears 119 and 118, respectively, one-quarter of a revolution or 90° apart.

As can be seen in FIGS. 5 and 8, the stopcock plug 61 has a threaded extension 125 at its small diameter end and a reduced diameter shank 126 at the large diameter end. Extending diametrically from opposite sides of shank 126 are bayonet pins 127 which are intended to be engaged by slots 128 in a tubular member 129 which snugly embraces shank 126 and, in turn, is snugly engaged within the inner wall of tubular projection 110. The end of tubular member 129 is closed by a disc-like element 130 which is provided with areas of two thicknesses with a step-like shoulder 131 extending between them in a plane parallel to a plane through the axis of rotation and spaced away from the diameter one-half the thickness of the pins 123 and 122. Pins 123 and 122 function to move disc 130 through shoulder 131. The nature of the cooperation between pins 123 and 122 and shoulder 131 can be seen from FIG. 5 but is better seen in FIGS. 6 and 7. It will be seen in FIG. 6 that gear 118 which is rotating in clockwise direction and carries pin 123 brings pin 123 into position to contact shoulder 131 or 130 at just the precise point shown in FIG. 6. One-quarter of a revolution later (FIG. 7) the disc has been rotated a quarter of its revolution by pin 123 as gear 118 continues to rotate. Rotation of disc 130 is in the counter-clockwise direction and causes the plug to rotate exactly ninety degrees and so proceed from alignment of one bore with its associated ducts to alignment of the other bore with its associated ducts. Pin 123 will continue to rotate for another three-quarters of a revolution of gear 118 without contacting member 130. Meantime, however, gear 119 is moving pin 122 in a counterclockwise direction and in one-quarter of a revolution it will contact one-quarter of a revolution. From the position of FIG. 7 it will contact shoulder 131. One-quarter of a revolution from then it will reposition disc 130 in the position shown in FIG. 6. As a safety precaution to prevent overshooting of the plug, disc 130 has one edge 130a cut off along a chord and a pin 132 is positioned to stop any further movement when edge 130a contacts pin stop. In either position shown in FIG. 6 or FIG. 7 the ducts will be accurately aligned with their proper channels because of the action of this stop.

With this type of motion transfer arrangement the ducts in the plug will remain in one effective position for one-quarter of a revolution of the motor, being moved from one position to the other during the next quarter of a revolution, and remain in that other effective position for a further quarter of a revolution, and be returned to the first position in the final quarter of a revolution. Slow speed motors, such as timing motors, are preferred. Selection of speed through selection of motors and reduction gear ratios will be of considerable consequence since this will determine the cycle length. Considerable variation in cycle length is possible and modification of the transfer mechanism to lessen the part of the total cycle used in change over will be in order in some cases.

Holding the plug 61 in place is a nut 133 which engages the threaded end 125 of the plug assembly 30'. The nut 133 is effective by urging washer 134 through gasket 135 against shoulder 136 of glass casting 62. Once assembled, by securing the nut 133, washer 134 and gasket 135, the front of the structure can be completed by putting in place cover plate 138 which may be a name-plate or other suitable closure.

Several things should be noted about the specific arrangement shown in FIG. 4 over the schematic arrangement of FIG. 1. In the position of the plug 61 shown in FIG. 4 reagent flows into the bore 31 and displaces air which, due to the proper selection of the diameter of the sight glass, escapes upward to atmosphere by way of the sight glass where its escape can be observed as indicating proper functioning of the device. After the escape of the air, the level of fluid in sight glass 32 indicates the level of reagent remaining in the reagent supply tank. At the same time duct 19 connects supply line 14 with the connecting line 16 leading to volume measuring overflow chamber 20. The sample can continue to flow into chamber 20 as long as the plug is oriented in this direction. Immediately upon rotation of the plug, however, the sample flow is cut off, leaving an exact volume determined by the volumetric capacity of duct system 16 and cup 20. Since bore 19 and bore 31 both mate with tubular extension 64 in the FIGS. 2–8 embodiment, flow proceeds into and out of the fixed volume system from the same point. Thus there is no problem about dead space or storage of any fluid in an area from which it cannot drain, and air through vent 86 will assure complete emptying. Thus when the plugcock is rotated 90° duct 31 which is filled with reagent will line up with ducts 16 and 34 and under gravity the exact volume of sample stored in the storage system will flush out all of the reagent in bore 31 and empty the bore under the effect of gravity. Mixture of the reagent and the test solution will occur in the mixing chamber by virtue of the toruous path provided. At this time the bore 19 serves no function in its position.

In other modifications of the present invention a similar structure might be employed using a plurality of precision volume bores, such as 31, to store reagent material prior to emptying in a mixing system. Such a system would have, therefore, more than two bores. It would have as many reagent tanks, and preferably as many sight glasses as there were reagents to be added in the analysis to be performed. Similarly, more than one test sample could be controlled in a single system using more than one constant volume collection or measuring system. With three bores employed for two reagents it might be necessary if a single plug were to contain all bores, to arrange for three separate fixed positions of the plug to accommodate all bores. Similarly, if three reagents were used four positions might be required and a suitable mechanism for driving the plug to the particular positions selected and stopping it there would be desirable. Alternatively, more than one plug stopcock might be employed in a more complex system provided that the drive system linked the plurality of plug stopcocks together in some suitable fashion. The schematic diagram of FIG. 1 suggests how a plurality of separate plug stopcocks could be employed.

In a particular embodiment of the invention which has been constructed along the lines shown in FIGS. 2–8, the reagent storage chamber has been designed to hold 500 milliliters to 1 liter of reagent. The storage chamber may be manufactured of Plexiglas or suitable transparent material or may be a polyethylene lined container of some sort. The fixed volume overflow chamber supplied by cup 20 and line 16 may have a capacity of 10 milliliters for measuring the sample. Again, the structure of the overflow device 17 may be all or partially of Plexiglas or some transparent material to facilitate the visual observation of the cycling of the unit. The precision bore 31 may be made with a 6 millimeter diameter and a length of approximately 20 millimeters to contain approximately 0.5 milliliter within the capacity of the bore. By proper selection of the motor and gear reducer, for example, using a cycle time of six minutes, ten complete cycles per hour of the unit may be obtained. If the reagent storage tank were made with a capacity storage of one liter, at the above rate of reagent consumption, i.e., 120 milliliters per day (240 analyses in 24 hours), a full tank of reagent would be sufficient for approximately eight days. A convenient once a week schedule of filling the reservoir could, therefore, be practically instituted.

Figure 9:
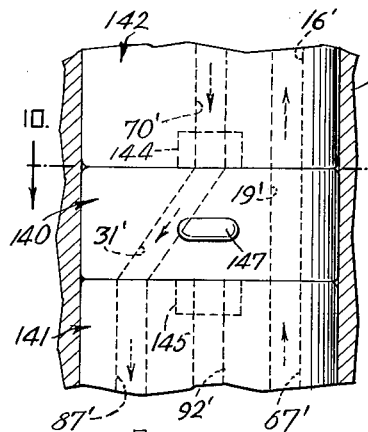
FIG. 9 shows in elevation a rotating disc sandwich structure which may be substituted for the plug stopcock.
Figure 10:
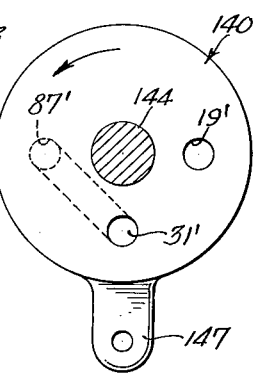
FIG. 10 is a view of the structure of FIG. 9 taken along line 10—10.
Figure 11:
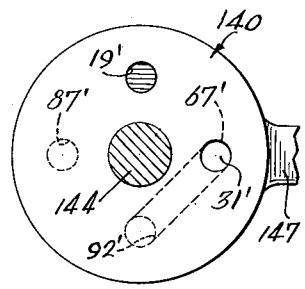
FIG. 11 is a view corresponding to FIG. 10 but with the disc rotated 90°.

Although the plug stopcock is preferred, other devices for performing an equivalent function may be employed. For example, the structure shown in FIGS. 9–11 may be substituted in the general system shown in FIG. 1 or with some re-arrangement in the system shown in FIGS. 2 through 8. As seen in FIG. 9, the structure is composed of a rotatable disc 140 sandwiched between a pair of relatively fixed members 141 and 142. The disc and the elements 141, 142 are preferably of cylindrical form and fit within a cylindrical housing 143 to hold them together. In other versions the elements 140, 141 and 142 may be held together by other means keeping their common surfaces pressed together. Extending through the fixed members 141 and 142 are ducts which correspond to the fixed ducts in the structure of FIGS. 1 to 8. Similarly, through the disc 140 are bores which are adapted to be aligned with these ducts to connect various combinations of ducts to accomplish essentially the same ends as accomplished by the movable plug of FIGS. 1–8. Duct 16', which extends through member 142, for example, is part of a fixed volume fluid system for obtaining a measured volume of fluid to be tested. Aligned with duct 16', along a line parallel to the axis, is a duct 19' through member 141 which connects to a supply of fluid to be tested. In the position of the rotatable member 140 shown in FIGS. 9 and 10 bore 19' in member 140 interconnects these ducts so that the fixed volume system is connected to the fluid sample supply. Similarly, duct 87', through member 141, connects to a reagent supply. Duct 70' through member 142 connects to a sight glass. Precision bore 31' is so arranged that it extends transversely through member 140 to connect ducts 87' and 70' in the position of FIGS. 9 and 10. When the tab 147 is moved by an appropriate mechanism from the position shown in FIG. 10 through 90° to the position shown in FIG. 11, the rotation of the disc 140 changes the alignment of its bores 31' and 19'. In its relocated position bore 19' serves no purpose, but bore 31' now connects the fixed volume fluid measuring system with duct 92' which leads to a mixing chamber. The flow of fluid sample to be tested from the fixed volume measuring system must proceed through the bore 31', which has previously been filled with reagent, into duct 92' and is effective to wash the reagent out of the duct. The position of FIG. 11 is maintained until after the fixed volume of the fluid is able to flow completely into duct 92' leaving bore 31' empty and ready for refilling by reagent when returned to the position of FIGS. 9 and 10. This is done at predetermined intervals in cycles similar to those of the structure of FIGS. 1–8.

Still other modifications of the bore providing structure are possible. For example, a slide with a bore extending through it to parallel flat walls which are engaged by other flat walls may produce the same action by a linear sliding movement. In such an arrangement, the ducts might be essentially like those shown in FIGS. 9–11 but their orientation would be linear in the direction of slide movement rather than rotational. Any other geometry capable of performing the function of the structure of the present invention may, of course, be substituted. It will be obvious to those skilled in the art that in each case snug engagement and fluid tightness of the relatively movable elements must be maintained.

Figure 12:
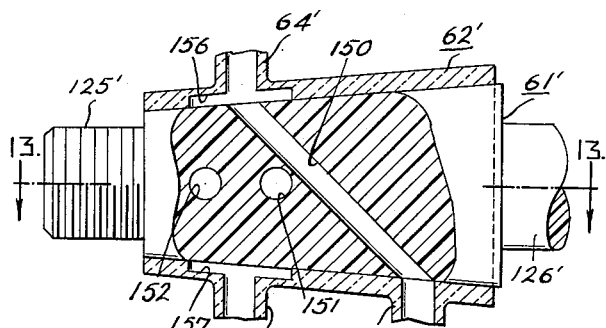
FIG. 12 is a sectional view of a plug stopcock having parallel precision bore to simultaneously receive in the position shown and simultaneously discharge two reagents.
Figure 13:
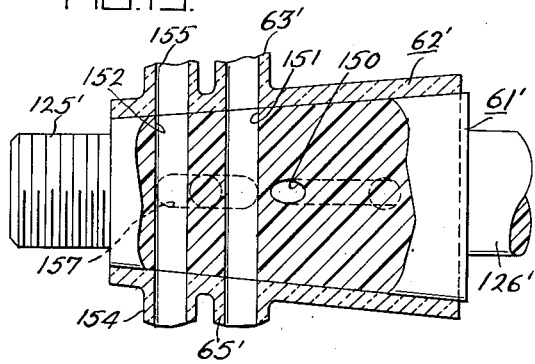
FIG. 13 is a sectional view of FIG. 12 taken along line 13—13.

In addition to the physical form of the bore providing element, another common type of variation is a system able to supply more than one reagent. FIGS. 12 and 13 show one such system wherein a plug stopcock arrangement similar to that seen in FIG. 5 is illustrated. In this case, however, instead of just two bores, there are three. In the view shown, members corresponding to the elements of FIG. 5 are indicated by the same numbers with the addition of primes thereto. A diagonal bore 150 corresponds to diagonal bore 19. Similarly, a bore 151 may be said to correspond to bore 31. However, here there is an additional bore 152 parallel to bore 151. As can be seen in FIG. 13, these parallel bores are effective in the position shown to connect separate reagents supplied through ducts and tubular extensions 65' and 154 to the socket 62', through the bores to tubular arm extensions 63' and 155, and thence through appropriate ducts to separate vented sight glasses for each of the reagents. Thus, in the position shown, the portions 151 and 152 are able to fill with reagent, while at the same time the fixed volume liquid supply connected at tubular arm 64' is able to be supplied from a suitable fluid sample reservoir through tubular arm 67' and the interconnecting duct 150. When the plug 61' is rotated 90°, the ducts 151 and 152 will connect the fixed volume fluid supply simultaneously to both ducts 151 and 152 through the enlarged area 156 so that fluid sample from the fixed volume supply will flow simultaneously through both ducts washing the reagents out of each and into enlarged area 157 immediately before the tubular extension 156 and on through tubular extension 156 to a mixing and reaction chamber. In other respects, the operation is the same.

In other instances, still more bores might be required. In other cases the same number or a different number might be located in a different arrangement, for example in an arrangement in which the bores are sequentially rather than simultaneously filled with reagent. The present invention contemplates any arrangement of bores in a single bore-containing element, such as a plug of a stopcock, or a pair or greater number of bore-containing elements synchronized by some sort of synchronizing means so that they act together.

In addition to the multiplexing of reagents in a single system, the present invention contemplates the serial connection of apparatus such as that shown in FIGS. 2–8. In this system, it is intended that perhaps a single reagent might be mixed with a fluid sample and given time for a reaction to occur before being mixed with perhaps a single further reagent. Of course, there are possibilities of many reagents alone or with a fluid sample being mixed and reacting and thereafter being mixed with further reagents.

Figure 14:
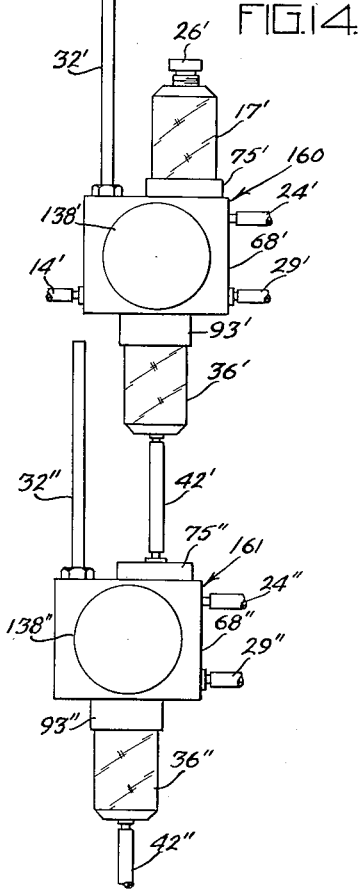
FIG. 14 is an elevational view showing two preferred systems of the present invention connected in series.

There are various possibilities of serially connecting two or more pieces of apparatus in accordance with the present invention. For example, in FIG. 14 apparatus is shown. In FIG. 14 the mixed and reacted output from a first apparatus, generally designated 160, is fed to a second apparatus, generally designated 161. In the first apparatus, parts corresponding to parts in FIGS. 2–8 are identified with corresponding numbers with the addition of primes thereto. In apparatus 161, corresponding parts are indicated by double primes added to the same numbers.

In the FIG. 14 arrangement the process proceeds as described above until the mixture reaches mixing and reaction chamber 36'. However, flow out of chamber 36' is a fixed volume which may be held in lead 42' and the internal fixed volume system of system 161. Alternatively, instead of removing the chamber corresponding to chamber 17, if the volume is sufficiently great a reservoir without the overflow feature may be substituted for the overflow vessel. After second system reagent has been fed from reagent supply line 29" into the proper measuring bore of the stopcock with the described venting action through sight glass 32", upon movement of the plug to proper position the accumulated mixture from chamber 36' is free to flow through the bore washing the reagent out ahead of it and into reaction and mixing chamber 36". The final mixture has time to react in chamber 36" before being syphoned to a sample cell corresponding to cell 43 in FIG. 1, for example.

The system can be used for many chemical analyses. It will be obvious that the system will lend itself to colorimetric pH determination, determination of hardness in water at various hardness levels by use of a two reagent system, and determination of residual chlorine as well as many other simple techniques common to colorimetric analysis.

The color comparator arrangement covered by the application of George Schneider, Serial Number 735,837, filed May 16, 1958, now Patent No. 2,991,688, entitled "Colorimetric Analyzer," provides one suitable color comparison system. Other known types of color comparator can be used but this compact colorimetric analyzer is preferred. It is equally possible, of course, to make the analysis by purely chemical means or by electrical means. For example, change in conductivity of the sample with reagent added over the sample without reagent may be used as indication of the amount of constituent present. Such a possibility is suggested in FIG. 1a which schematically represents replacement of the colorimetric analysis means within the dashed line box of FIG. 1 with electrometrical elements. Parts corresponding to those in FIG. 1 have been given corresponding number designators with the addition of primes thereto.

By way of example and not by way of limitation it is contemplated that the actual analysis may be accomplished by one or more means of the following types: colorimetric or photometric, electrometric (including pH detection, conductivity, redox potential, coulometric analysis, or by means of special electrode designs for detection of ions), and temperature sensing (sensitive to temperature differentials in exothermic or endothermic reactions).

A preferred embodiment and several modifications of the present invention have been described. Still other modifications and embodiments will occur to those skilled in the art. All such embodiments and modifications within the scope of the claims are intended to be within the scope and the spirit of the present invention.

I claim:

1. A chemical analysis system comprising snugly-fitting movable and stationary elements, the movable one of which has a bore of known volume extending through that element, a reagent supply duct extending through the stationary element and adapted to connect a supply reservoir of reagent with the bore in a first position of the movable element so that the bore can fill with reagent, a fixed volume measuring system for a second fluid including a supply duct extending through the stationary element, means adapted to connect the fixed volume measuring system to a fluid supply for the second fluid and different from the reagent reservoir whereby said second fluid may be fed to and stored in the measuring system while the bore is in its first position, and a mixture duct extending through the stationary element, said fixed volume system for the second fluid adapted to be connected by the bore in a second position to the mixture duct whereby the second fluid in the fixed volume system can flow through the bore into the mixture duct, thereby forcing through and washing out into the mixture duct the measured volume of reagent within the bore thereby establishing a definite and known ratio of fluid volumes in the mixture.

2. The chemical analysis system of claim 1 in which a vented column extending through the stationary element is connected with a vented reagent supply whereby air entrapped in the bore is free to escape through one of the vented elements.

3. The chemical analysis system of claim 1 in which a second bore is provided in the same movable element which contains the first bore, said second bore being adapted to connect the same duct of the fixed volume second fluid measuring system to a sample fluid supply in the first position of the first bore and in which the same duct of the fixed volume measuring system is, in turn, connected by the first bore in the second position of the movable element to permit flow of the second fluid from the fixed volume measuring system to the mixture duct.

4. A chemical analysis system comprising a plug stopcock having a plug within a sleeve, said plug having a bore of known volume extending through the plug, a reagent supply duct extending through the sleeve and adapted to connect a supply reservoir of reagent with the bore in a first position of the plug so that the bore can fill with reagent, a fixed volume measuring system for a second fluid including a duct extending through the sleeve means adapted to connect the fixed volume measuring system to a fluid supply for the second fluid and different from the reagent reservoir whereby said second fluid may be fed to and stored in the measuring system while the bore is in its first position, and a mixture duct extending through the sleeve, said fixed volume system for the second fluid adapted to be connected by the bore in a second position to the mixture duct whereby the second fluid in the fixed volume system can flow through the bore into the mixture duct thereby forcing through and washing out into the mixture duct the measured volume of reagent within the bore thereby establishing a definite and known ratio of fluid volumes in the mixture.

5. The system of claim 4 in which the duct through the sleeve connected to a vented sight glass is adapted to be connected by the bore in its first position to the reagent supply duct, said duct and sight glass being of sufficient diameter to permit the escape of air entrapped in the bore.

6. The system of claim 4 in which the mixture duct is so positioned that all fluid in the fixed volume second fluid measuring system will flow through it by gravity.

7. The system of claim 6 in which there is provided a sample supply duct extending through the sleeve and adapted to be connected to a supply of sample and a second bore is provided through the same plug so that in the first position the second bore will connect said supply duct to the fixed volume second fluid measuring system.

8. The system of claim 7 in which the mixture duct is connected with a mixing and reaction chamber designed to hold the mixture sufficiently long for mixing and reaction to take place.

9. The system of claim 8 in which the mixing chamber is provided with a siphon system which overflows and begins siphon action just prior to the complete filling of the mixing chamber and in which the mixing chamber empties into an analysis cell of much smaller capacity than the volume of the mixture from the mixing chamber and is thereby flushed out.

10. The system of claim 7 in which the fixed volume measuring system includes an overflow vessel which is adapted to overflow when the fixed volume second fluid is exceeded.

11. The system of claim 8 in which the system including the stopcock sleeve and the ducts are cast in a solid block to provide a unitary structure.

12. The system of claim 9 in which the fixed volume measuring system including the overflow is a part of the unitary structure.

13. The system of claim 7 in which means is provided to drive the plug from the first position to the second position and in repetitive cycles.

14. A system for analysis of a chemical constituent in a test fluid comprising a test fluid supply, a reagent supply, a mixture and reaction component for mixing and permitting reaction of test fluid and reagent, a fixed volume measuring system for a second fluid, an essentially leakproof movable element through which extends a bore of known volume capable of connection with the reagent supply in a first position of the movable element and capable of connection with the mixture component in a second position, means for selectively connecting the fixed volume second fluid measuring system to the mixture component, means for selectively connecting the fixed volume second fluid measuring system to the test fluid supply and synchronizing means for effecting the selective connection means such that, when reagent is being supplied to the bore in the first position, the second fluid is being fed to the fixed volume measuring system and, when the reagent is being emptied into the mixing component, the second fluid from the fixed volume measuring system is likewise being fed to the mixing component.

15. The system of claim 14 in which the means selectively connecting the fixed volume measuring system to the mixture component includes the same bore into which the reagent is fed in its first position.

16. The system of claim 15 in which the bore in the first position aligns the reagent suply with a vented column.

17. The system of claim 1 in which at least two bores of known volume connect with a corresponding number of reagent supply ducts adapted to connect a corresponding number of supply reservoirs of reagents with their associated bores.

18. The system of claim 16 in which a cell is provided in each of the respective flow lines of the test fluid and the mixture of test fluid and the reagent said cells being part of a device adapted to perform comparative analysis.

19. The system of claim 18 in which a sample cell much smaller than the mixture and reaction chamber is employed and connected to the mixture chamber to receive the fluid mixture therefrom whereby initial flow of the mixture through the cell before measurements will flush out the cell.

20. The system of claim 1 in which a colorimetric analysis system is provided to analyze the mixture colorimetrically and includes a sample cell which is connected to and receives the fluid mixture from the mixture and reaction chamber.

21. The system of claim 1 in which an electrometrical system is provided to analyze the mixture electrometrically and is coupled to and receives the mixture from the mixture and reaction chamber.

22. The system of claim 1 in which a similar system is employed to provide a second step in a chemical analysis and in which the fixed volume system is connected to the outlet from the mixture duct of the first system so that the mixture from the first system provides the second fluid of the second system to be in turn mixed with a second reagent in the second system.

References Cited in the file of this patent

UNITED STATES PATENTS

| | | |
|---|---|---|
| 1,919,858 | Pettingill | July 25, 1933 |
| 1,960,615 | Baker | May 29, 1934 |
| 1,973,755 | Geyer | Sept. 18, 1934 |
| 2,019,871 | Pettingill | Nov. 5, 1935 |
| 2,063,140 | Allison | Dec. 8, 1936 |
| 2,102,282 | Roy | Dec. 14, 1937 |

UNITED STATES PATENT OFFICE
CERTIFICATE OF CORRECTION

Patent No. 3,028,225 — April 3, 1962

Robert T. Sheen

It is hereby certified that error appears in the above numbered patent requiring correction and that the said Letters Patent should read as corrected below.

Column 4, line 15, for "top" read -- tap --; column 5, line 3, for "provided" read -- provides --; line 29, for "wall" read -- walls --; same column 5, line 68, for "thereton" read -- thereon --; column 7, line 24, for "toruous" read -- tortuous --; column 10, line 24, for "coulometric" read -- colorimetric --; column 11, line 31, after "sample" insert -- fluid --; line 48, after "volume" insert -- of the --; same column 11, line 54, before "measuring" insert -- second fluid --; column 12, line 10, for "effecting" read -- affecting --; line 22, for "suply" read -- supply --.

Signed and sealed this 4th day of September 1962.

(SEAL)
Attest:
ERNEST W. SWIDER
Attesting Officer

DAVID L. LADD
Commissioner of Patents